Feb. 27, 1968   J. SHERLOCK   3,371,216
PROTECTIVE APPARATUS
Filed Jan. 2, 1964   2 Sheets-Sheet 1
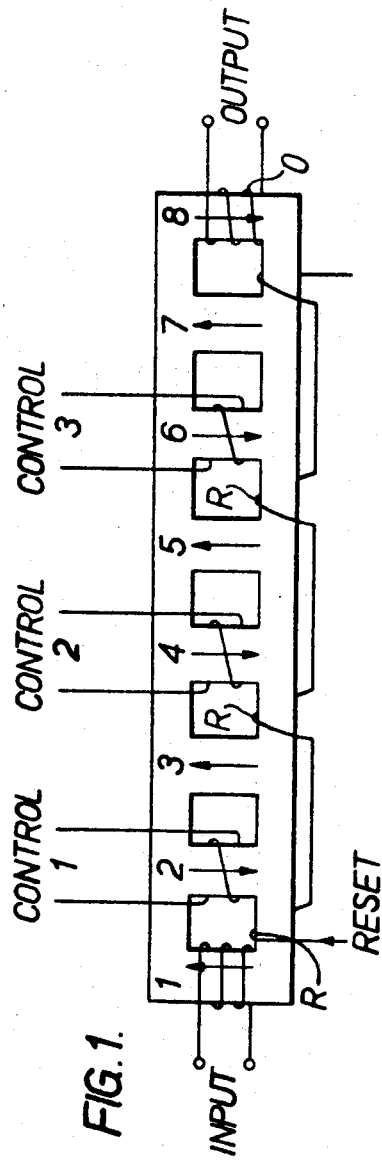
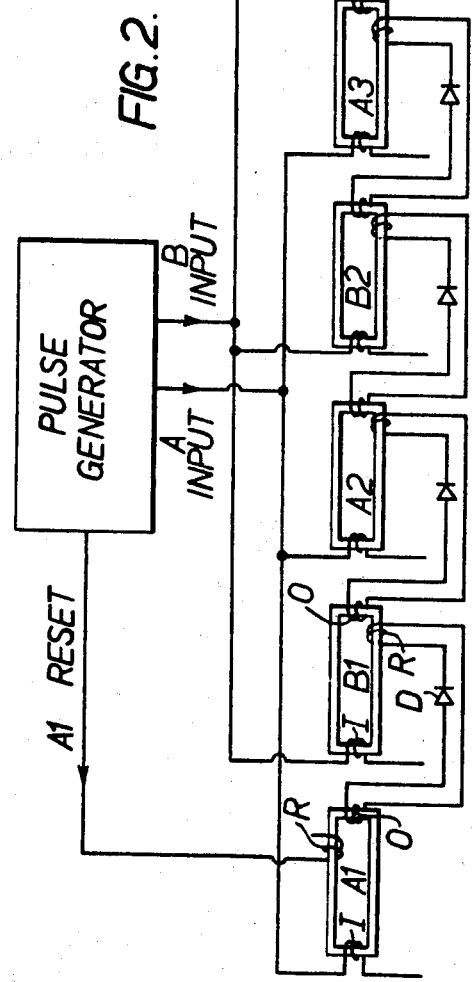

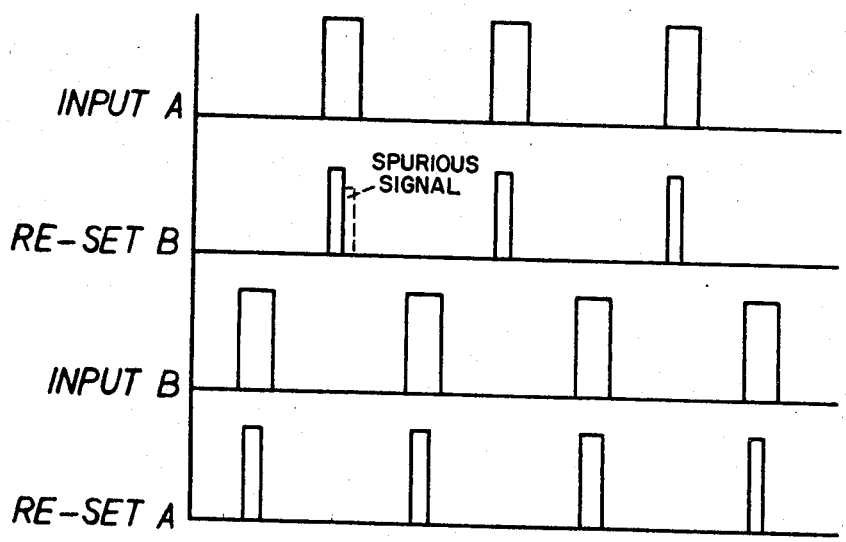

United States Patent Office 3,371,216
Patented Feb. 27, 1968

3,371,216
PROTECTIVE APPARATUS
James Sherlock, Cropston, England, assignor to Associated Electrical Industries Limited, London, England, a British company
Filed Jan. 2, 1964, Ser. No. 335,260
Claims priority, application Great Britain, Jan. 7, 1963, 706/63
2 Claims. (Cl. 307—88)

ABSTRACT OF THE DISCLOSURE

A cascaded system of laddics has the output winding of each laddic except the last connected to the resetting winding of the next laddic in sequence so that the laddics are reset sequentially, a separate resetting means being supplied for the first laddic. The input signals are applied in alternation to a first alternate laddic in the series of cascaded laddics and then to the intervening laddics, the arrangement being such that output signals of the correct polarity are produced at the last laddic only if all control signals are present.

---

This invention relates to protective apparatus and more particularly to protective apparatus employing laddics.

A laddic is a device comprising a ferrite magnetic core in the form of a magnetic network having an input limb carrying an input winding and magnetically in series with an output limb carrying an output winding, together with a number of bypass limbs some of which carry control windings and so arranged that after resetting, provided all the control windings are energized a signal applied to the input winding can produce a signal in the output winding but deenergization of any control winding will prevent a signal appearing in the output winding.

Laddics are usually in the form of a ladder with an input winding on one end rung and an output winding on the opposite end rung, the intermediate rungs forming the bypass limbs. They may be employed in protective systems in which input signals alternate with reset signals and produce corresponding output signals but if any one of the control rungs is deenergized due to a fault in the equipment being protected then the output limb is bypassed magnetically and the absence of output signals indicates that there is a fault.

There is a practical limit to the length of a laddic for satisfactory operation and it is often necessary to employ a plurality of laddics connected effectively in series in order to provide a sufficient number of control coils to meet the demand.

It is also known that if the B-H loop departs from the characteristic shape for this type of material, one cause of which might be a crack in the core, it causes the flux in the output rung to change when the reset pulse terminates. This change in flux is in a direction to produce in the output winding spurious pulses of the same polarity as the normal output pulse, and since they would be produced even when one or more of the control coils is deenergized, they could be taken to indicate that all the control coils were healthy when in fact they were not.

The main object of the invention is to provide an improved cascade laddic system which distinguishes between failure of a control signal and a fault in the laddic itself.

According to the present invention a protective circuit comprises a plurality of laddics arranged in cascade with the output winding of each laddic (except the last) connected to the resetting winding or windings of the next laddic in sequence, so that in operation an output signal from one laddic will reset the next laddic in the sequence (except the first for which resetting means are provided) and means for applying signals first to the input windings of alternate laddics and then to the input windings of the intervening laddics recurrently and the arrangement being such that output signals of the correct polarity are only produced at the last laddic if all control signals are present.

In order that the invention may be more clearly understood reference will now be made to the accompanying drawings, in which:

FIG. 1 is a diagrammatic view of the usual form of laddic.

FIG. 2 shows diagrammatically a cascade arrangement of laddics in accordance with the invention, and FIG. 3 shows graphically the timing of the pulses in the arrangement of FIG. 1.

Referring first to FIG. 1, it will be seen that the normal form of a laddic is in the nature of a ferrite ladder having side arms and cross rungs spaced apart along the side arms. In the actual arrangement shown there are eight rungs though clearly this is by way of example only. There is an input winding on the first rung and an output winding on the eighth, i.e. the last, rung. Control windings are arranged on rungs 2, 4 and 6 and reset windings are arranged on the side arms between rungs 1 and 2, between rungs 3 and 4, between rungs 5 and 6 and between rungs 7 and 8.

This is only one example of the way in which the reset windings are arranged and they may be arranged in other ways provided that, combined with the action of the control windings the required reset flux pattern is produced.

It is found that with such an arrangement, after resetting, provided the control rungs are energized, a signal applied to the input winding will produce a signal in the output winding. If, however, any one of the control rungs is not energized when the input signal is applied, then no signal will be produced at the output.

The exact theory of operation is somewhat complicated and not fully understood but it is thought that the following may be regarded as a simplified explanation for purposes of understanding the invention.

Assume that the reset windings in combination with the control windings produce residual fluxes in the directions shown by the arrows, that is to say, upwards in the odd numbered rungs and downwards in the even numbered rungs. Assume also that the control windings produce M.M.F.'s in the rungs acting in the same directions as the residual fluxes indicated by the arrows. If now an input signal of the appropriate strength is applied to the input winding so as to tend to reverse the residual flux in rung 1, it will not be able to complete its magnetic circuit through rung 2 as it will be opposed by the M.M.F. due to the control winding 1. Similar remarks apply to rungs 4 and 6. Rung 3 will be magnetized in the upward direction, i.e. in the same direction as the M.M.F. due to the input signal, and as it will be saturated or nearly saturated it will appear as a path of high reluctance. Similar remarks apply to rungs 5 and 7. It follows therefore that the only available path is through rung 8 so that an output signal will be produced. If, however, any of the control currents are absent for instance control current 1, then the flux due to the input signal would be able to pass through rung 2 which in the absence of the M.M.F. due to the control signal will offer a path of low reluctance and will bypass rung 8.

It follows, therefore, that if any one of the control rungs is deenergized the output limb will be bypassed and no output signal will be produced.

As mentioned above, there is a practical limit to the size of a laddic and hence to the number of rungs carrying control windings which may be applied to a single laddic and in such cases it is therefore necessary to connect a number of laddics in cascade.

It has also been explained above that if the B-H loop departs from the characteristic so-called square shape due for instance to a crack in the core, when the reset pulse terminates, the flux in the output rung may change and cause a spurious output signal which may be taken to indicate that all the control coils are healthy when in fact they are not.

In the arrangement of FIG. 2 a number of laddics are arranged in cascade. The odd numbered laddics have the references A1, A2, A3 . . . and the even numbered laddics the references B1, B2, B3. The laddics are shown diagrammatically but may be of the form shown in FIG. 1. In each laddic the output winding O is connected through a rectifier or amplifier D to the reset winding R of the next laddic in the series. Thus, the output winding of laddic A1 is connected to the reset winding of laddic B1 and similarly, the output winding of laddic B1 is connected to the reset winding of laddic A2. A pulse generator supplies pulses alternately to the A and B inputs feeding the input windings of the A and B laddics respectively. It also supplies a reset pulse to the laddic A1 since there is no preceding laddic from which a signal may be derived and correspondingly the output winding of laddic B3 provides the output signal from the apparatus.

It follows that when a pulse is applied to the A input, all the A laddics will receive input signals which will set them and cause them to deliver signals from their output windings to the reset windings of the adjacent B laddics. Similarly pulses applied to the B input will set the B laddics and cause them to deliver reset pulses to the adjacent A laddics. It follows, therefore, that at one time instant all the A laddics are set and the B laddics reset; at the next time instant all the A laddics are reset and the B laddics set, these changes alternating recurrently as is shown graphically in FIGURE 1. It will be seen that the output pulses forming the reset pulses are of shorter duration than the input pulses which produce them. If, therefore, as explained above, there is a fault, such as a crack in a laddic, in laddic B1 such that at the termination of the reset signal a spurious output signal from B1 is produced which is applied as a reset signal to laddic A2, this spurious signal, however, will occur at the same time as the A input signal to laddic A2, though of shorter duration, and hence will have no effect on laddic A2. Similar remarks apply to any of the other B laddics and also to the A laddics since any spurious output signal from an A laddic applied to the reset winding of the succeeding B laddic will occur at the same time as the input signal to the B laddic.

In such an arrangement therefore no output pulses will appear at the output winding of the final laddic in phase with the input to the last laddic unless all the control coils are energized irrespective of whether or not there are any cracks or other faults in the cores.

It will be understood that the arrangement shown is an example only and there may be any suitable number of laddics arranged in cascade and, moreover, they are not necessarily of the precise arrangement of FIG. 1.

As mentioned above the reset windings may be arranged in other ways and these may be as described in co-pending application of Roy Hutchins and John Edmund Robson for Protective Apparatus, Serial No. 340,342, filed January 27, 1964, owned by the assignee of this application, said application of Hutchins and Robson corresponding to British application No. 3657/63.

What I claim is:

1. A protective circuit comprising a plurality of laddics arranged in cascade each laddic comprising a magnetic circuit carrying an input winding, an output winding, at least one reset winding and a plurality of control windings, connections between the output windings of each laddic excepting the last laddic and the respective reset winding of the next laddic in sequence, means for applying a reset signal to the reset winding of the first laddic in the sequence, means for applying input signals first to the input windings of alternate laddics and then to the input windings of the intervening laddics recurrently to obtain output signals at the last laddic in the sequence only if signals are present on all the control windings.

2. A protective circuit comprising a plurality of laddics in cascade, each laddic comprising a magnetic core having an input limb carrying an input winding and magnetically in series with an output limb carrying an output winding, each laddic also comprising a plurality of bypass limbs at least some of which carry control windings adapted when energized to block the magnetic circuits through the bypass limb and at least one reset winding adapted to reset the flux in the output limb, respective connections between the output winding of each laddic and the reset winding of the next laddic in sequence, means for applying a reset signal to the reset winding of the first laddic in the sequence, means for applying input signals first to the input windings of alternate laddics and then to the input windings of the intervening laddics recurrently to obtain output signals at the last laddic in the sequence only if signals are present on all the control windings.

No references cited

BERNARD KONICK, *Primary Examiner.*

P. SPERBER, *Assistant Examiner.*